United States Patent [19]

Matteson

[11] 4,311,377
[45] Jan. 19, 1982

[54] IDENTIFYING CASSETTES LOADED IN CAMERAS

[75] Inventor: Lawrence J. Matteson, Rochester, N.Y.

[73] Assignee: Eastman Kodak Company, Rochester, N.Y.

[21] Appl. No.: 166,928

[22] Filed: Jul. 8, 1980

[51] Int. Cl.³ .................. G03B 17/36; G03B 17/26
[52] U.S. Cl. ............................ 354/217; 354/275
[58] Field of Search ............ 354/275, 289, 21, 217, 354/218; 355/41; 352/172

[56] References Cited

U.S. PATENT DOCUMENTS

| | | | |
|---|---|---|---|
| 3,290,987 | 12/1966 | James et al. | 355/41 X |
| 3,747,497 | 7/1973 | Daitoku et al. | 354/217 X |
| 4,021,828 | 5/1977 | Iura et al. | 354/289 X |
| 4,034,393 | 7/1977 | Goldmacher | 354/217 X |
| 4,114,995 | 9/1978 | Stieringer et al. | 352/172 X |
| 4,173,401 | 11/1979 | Harvey | 354/275 X |
| 4,174,888 | 11/1979 | Hunn et al. | 354/218 X |

*Primary Examiner*—Donald A. Griffin
*Attorney, Agent, or Firm*—Raymond L. Owens

[57] ABSTRACT

A photographic camera recognizes when a partially used film cassette is reloaded into the camera. Following the loading of such a cassette the camera drives the film to position an unexposed film frame for exposure.

3 Claims, 4 Drawing Figures

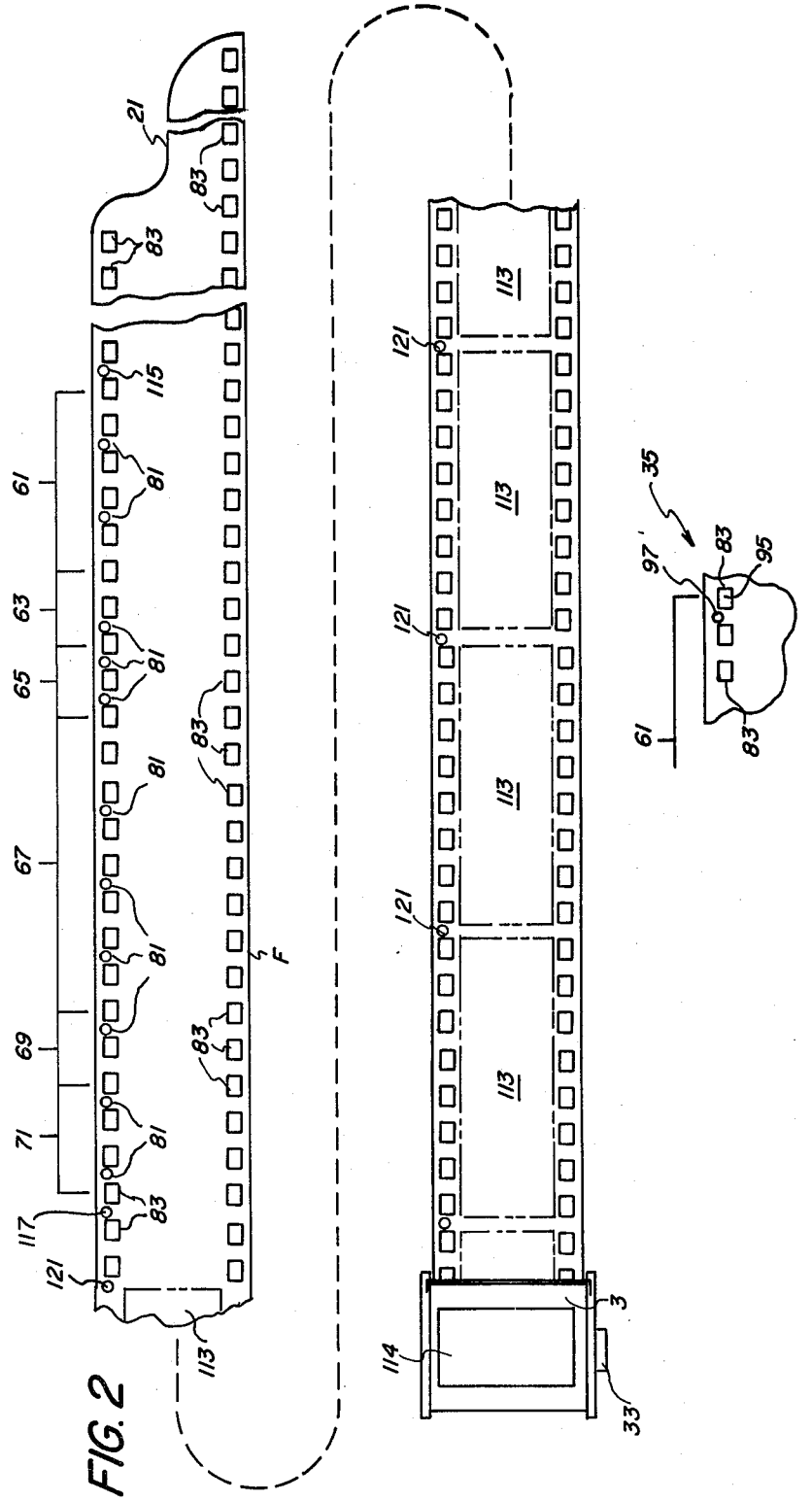

IDENTIFYING CASSETTES LOADED IN CAMERAS

CROSS-REFERENCE TO RELATED APPLICATION

Reference is made to commonly assigned U.S. patent application Ser. No. 146,721, entitled APPARATUS FOR RESTORING LOST DATA TO A MEMORY filed in the name of Donald M. Harvey on May 5, 1980; and to U.S. patent application Ser. No. 166,939, entitled CAMERA ADAPTED TO FACILITATE REMOVAL AND REUSE OF EXPOSED FILM CASSETTES filed in the name of Donald M. Harvey on even date herewith, both of which are incorporated by reference herein.

BACKGROUND OF THE INVENTION

1. Field of the Invention

The present invention relates to cameras which recognize the reloading of partially used film cassettes.

2. Description of the Prior Art

A photographer sometimes desires to remove a film cassette from his camera before all of the film frames have been exposed. This is likely when using 35mm cameras because the cassettes for these cameras frequently contain sufficient film for as many as 36 full frame exposures. To illustrate, let us assume a situation where a photographer loads a camera with a film cassette containing a 36 exposure color film having an ASA number of 400 and "takes" twenty pictures, i.e. sequentially exposes 20 consecutive film frames to form latent images. He then decides to take pictures of another subject for which a 20 exposure, black and white, general purpose film having an ASA number of 125 is more suitable. The photographer carefully rewinds the color film back into its cassette, leaving a part of the filmstrip leader tongue extending from the cassette, removes the cassette from the camera, and loads the camera with a new cassette containing the black and white film. If the photographer plans to use the 16 unexposed frames of the removed color film, at some later time, he will probably note somewhere on the removed cassette the number of the last film frame that was exposed. Sometime later, when the partially used cassette of color film is reloaded into the camera, the photographer advances the film to locate the first unexposed film frame for exposure. Of course, if the photographer forgot to annotate the cassette, or misinterprets his notes or fails to properly locate the film in the camera, he may advance the film too far, wasting one or more film frames. On the other hand, if the filmstrip is insufficiently advanced, double exposure results. In an even worse case, if the photographer ignores his notes or forgets to advance the film beyond the first frame, there will be double exposure of the first twenty film frames.

SUMMARY OF THE INVENTION

Using a camera embodying the present invention, in the situation described above, the photographer depresses a rewind button and the camera rewinds the color film back into the cassette leaving a part of the tongue extending from the cassette. The photographer removes the partially used cassette from the camera, and loads the black and white film into the camera. The camera automically advances the first frame of the black and white film to the exposure position and is adjusted to function with the number of exposure frames of the black and white film. Sometime later when the photographer reloads the partially used color film cassette, the camera recognizes that cassette, and moves the first of the remaining unexposed frames, in this case frame 21, to the exposure position.

In accordance with the invention, a photographic camera includes means for receiving a cassette having a filmstrip with a predetermined number of film frames and identifying indicia. The camera includes indicia reading means for producing cassette identification signals and camera adjusting signals and a memory for storing such signals after the removal of a cassette having unexposed film frames from the camera. When cassettes are subsequently loaded in the camera, their filmstrip indicia are read and a comparison is made with the signals in memory. A comparison signal is produced when a partially used cassette is reloaded into the same camera. In a preferred embodiment, the film advancing means responds to the comparison signal and advances the filmstrip from the cassette to a position where the first unexposed film frame will be exposed upon actuation of the shutter. The frustration and expense occasioned by wasted film and double exposures are thus eliminated.

BRIEF DESCRIPTION OF THE DRAWINGS

FIG. 2 shows a section of a typical filmstrip which can be employed in the camera of FIG. 1;

FIG. 3 shows the location of reading station devices which decode indicia shown on the filmstrip of FIG. 2.

DESCRIPTION OF THE PREFERRED EMBODIMENT

The Camera

Figure 1:
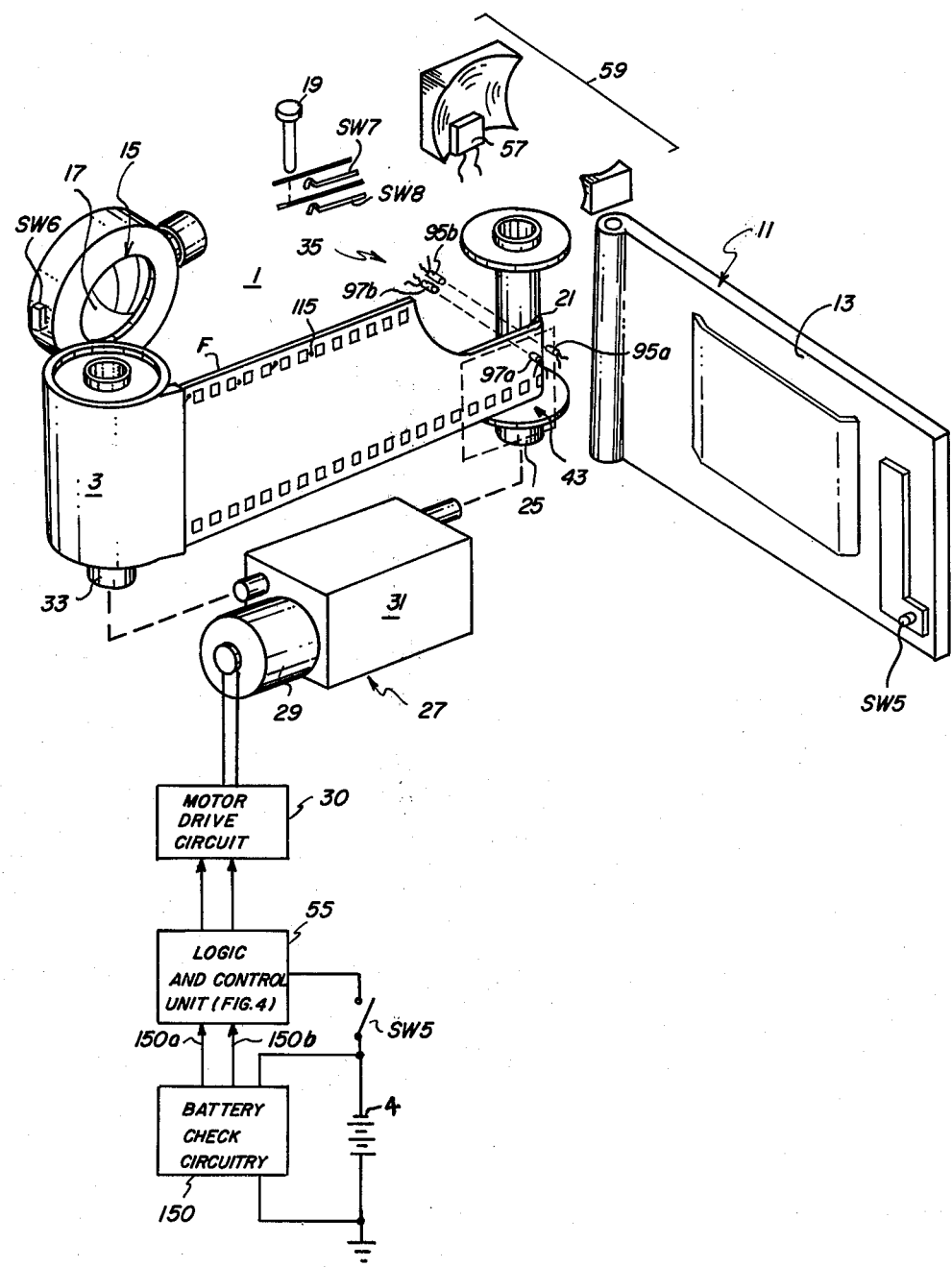
FIG. 1 is a perspective view of various elements of a still picture camera in accordance with a preferred embodiment of the present invention.

A preferred embodiment of the invention is disclosed in connection with a 35mm still camera which receives a conventional film cassette. It will be understood that the invention is not limited to such cameras, but can be used in other still cameras which accept film magazines, cartridges, or rolls. Moreover, those skilled in the art will appreciate that the present invention can also be used in cine cameras. In FIG. 1, various elements of a 35mm still picture camera are shown. Because such cameras are well known, this description will be directed in particular to elements forming part of or cooperating directly with apparatus embodying the present invention. It is to be understood, however, that the disclosed camera elements are exemplary and those shown as well as those not specifically shown or described may take various forms known to those skilled in the camera art.

The camera in FIG. 1 has a housing providing a chamber for receiving a 35mm film cassette 3 and a conventional D.C. battery 4, shown schematically. The battery typically will have a voltage rating of nine(9) volts. The cassette 3 includes a recording medium such as a filmstrip F having cassette identifying indicia which will be described with reference to FIG. 2. A hinged back 11 forms part of the camera housing and has a press-to-close switch SW5 located on its interior face 13. Switch SW5 is also schematically shown to be connected between the battery 4 and logic and control unit (LCU) 55. When the back 11 is closed, the switch SW5 is closed by contact with the film cassette 3. If no film cassette is present in the cassette receiving chamber of the camera housing, the switch SW5 will remain open after the back 11 is closed.

A conventional shutter assembly 15 includes an objective lens and a shutter, (not shown) and an adjustable diaphragm represented by thin metal blades 17 partially visible in FIG. 1. The film exposure position is located in the image plane of the objective lens. Mounted on shutter assembly 15 is a biased-open switch SW6 is closed upon closing the shutter and reopened upon opening the shutter. Operation of the Switch SW6 provides input signals to the LCU 55 indicating whether the filmstrip can be advanced, i.e. indicating whether the shutter is closed. A shutter release 19 operates two normally open switches SW7 and SW8. When the shutter release 19 is completely depressed, signals are provided through switches SW7 and SW8 to the LCU 55, which in turn provides signals for actuating the shutter so that light gathered by the picture-taking lens exposes a film frame on the filmstrip F, which is supported at the exposure position by a pressure plate 43. More specifically, when the shutter release 19 is only partially depressed to a standby position, the switch SW7 closes and the shutter speed and the lens aperture are adjusted in accordance with scene illumination by an exposure control device, not shown, but the shutter remains closed. Also, upon switch SW7 closing, the LCU 55 interrogates the exposure control device and actuates an indicator 57 if flash exposure is needed. Upon complete depression of the shutter release 19, switch SW8 closes and the LCU 55 causes the shutter 17 to temporarily open and then close, thereby exposing a film frame.

After the film cassette 3 is received in the camera by a conventional cassette receiving structure (not shown), a reduced width leader tongue 21 of the filmstrip F is secured to a take-up spool 25. The take-up spool 25 is permanently rotatably mounted in a spool receiving chamber within the camera housing. After the back 11 is closed, a motor-driven film transport 27, coordinated with the shutter assembly, rotates spool 25 and advances the filmstrip F frame by frame from the cassette 3, across the exposure position, and onto the take-up spool 25 as successive exposures are made. When reversed, the film transport 27 drives a core 33 within cassette 3 to rewind the filmstrip F from the take-up spool 25 back into the cassette 3. The film transport 27 includes a reversible-drive electric motor 29, a bi-directional motor drive circuit 30 and a transmission 31. The transmission 31 selectively couples motor 29 to the take-up spool 25 or to the core 33 to which the filmstrip F is attached within cassette 3. The motor drive circuit 30 is under the supervision of the LCU 55. Although not shown, the transmission 31 includes a suitable gear train and clutches which free either the core 33 or the spool 25 to rotate when the other is positively driven. For a further description of a mechanism analogous to transport 27, see the previously identified cross-references.

The indicator 57, located in a camera viewfinder 59 in FIG. 1, is coupled to the LCU 55 and displays information such as the number of film frames still available for exposure each time a film frame is advanced to the exposure position and a warning signal indicating a film break, a film jam, or disengagement of the leader tongue 21 of the filmstrip 7 from the take-up spool 25. The indicator 57 may be constructed of any suitable display means, such as liquid crystals or LED's.

A reading station 35 includes sensor devices which monitor indicia including sprocket holes on the fimstrip F as will be described later.

Filmstrip

FIG. 2 shows a portion of the filmstrip F intended use in the camera shown in FIG. 1. The filmstrip F includes the leader tongue 21 and has a predetermined number of film frames 113, e.g. 12, 24, or 36 frames. Conventional sprocket holes 83 are formed along the opposite edges of the fimstrip F. The holes 83 are aligned longitudinally and laterally of the filmstrip.

Along the top edge of the filmstrip shown in FIG. 2, and intermediate sprocket holes 83 are indicia forming a code pattern in a series of binary coded areas 61, 63, 65, 67, and 69, which respectively identify the following photographic characteristics of the filmstrip: ASA number, film type, spectral sensitivity, expiration date, and the number of exposure or film frames 13 on the fimstrip. The ASA number is used by the LCU 55 to automatically adjust exposure control circuitry. Another code area 71, shown for illustrative purposes as a three-bit binary word, in combination with the other indicia is used by LCU 55 to identify the particular cassette 3 loaded in the camera. On any given day, during manufacture of a production run of identical filmstrips, the code areas 61, 63, 65 and 69 will be the same, but different bit patterns will be used for word 71 to distinguish any eight consecutively manufactured filmstrips. Thus, it is unlikely that a photographer will purchase, with an order of eight or less cassettes of the same film, two cassettes having both the same expiration date and the same code pattern 71. For most purposes, therefore the code areas 61, 63, 65, 67, 69, and 71 on a given filmstrip can be considered to uniquely identify that cassette.

The binary coded areas include perforate or imperforate bits 81, respectively representing a binary 1 or a binary 0. The bits are located between successive sprocket holes 83. It will be understood that indicia other than perforations and sprocket holes (e.g. magnetic areas) can also be used in accordance with the invention. The perforate and/or imperforate bits of an area comprise a particular binary word that represent that photographic characteristic identified by that coded area. In order to simplify the means whereby a detecting device distinguishes between the code area bits and the sprocket holes, the code area bits are in off-center longitudinal alignment with the sprocket holes and are substantially narrower than the sprocket holes. The filmstrip also includes an "initiation" bit or perforation 115 preceding the first binary coded film area, and a parity bit 117 following the last binary coded area 71 in FIGS. 2, 177 is shown as a perforated bit. When the initiation perforation is sensed, a signal is applied to the LCU 55 conditioning LCU 55 for code detection, and the parity coded bit permits the LCU to perform a parity check to determine whether or not there was a misreading of the preceding binary coded areas. There are different predetermind numbers of sprocket holes between the initiation bit and the parity bit, between the parity bit and the first film frame, and between subsequent film frames.

Reading Station

The station 35 includes optical bit detecting devices to determine whether a bit between a pair of adjacent sprocket holes is perforate or is imperforate, i.e. whether the bit represents a binary 1 or a binary 0. As shown in FIGS. 1 and 3, a sprocket hole detector device 95 and a perforation detector device 97 are aligned obliquely with respect to the film edge to simultaneously detect a sprocket hole 83 and a bit of one of the code areas, whereby coincident detection by both detectors confirms that a bit represents a binary 1 whereas detection of a sprocket hole by device 95 but no detection of a perforation by device 97 indicates a binary 0. Moreover, the detection of successive sprocket holes by the device 95 permits the LCU 55 to verify film movement. In FIG. 1, the device 95 is shown to include a light-emitting diode 95a and a phototransistor 95b connected to the LCU 55. Similarly, the device 97 includes a light-emitting diode 97a and a phototransistor 97b connected to the LCU 55. The light produced by the diodes is selected to be in a region of the spectrum which will not sensitize the emulsion layers of the film. Rather than using optical sensors, it will be appreciated that capacitive, mechanical or other sprocket hole and perforation sensors can also be used in accordance with the invention.

Logic and Control Unit (LCU)

Figure 4:
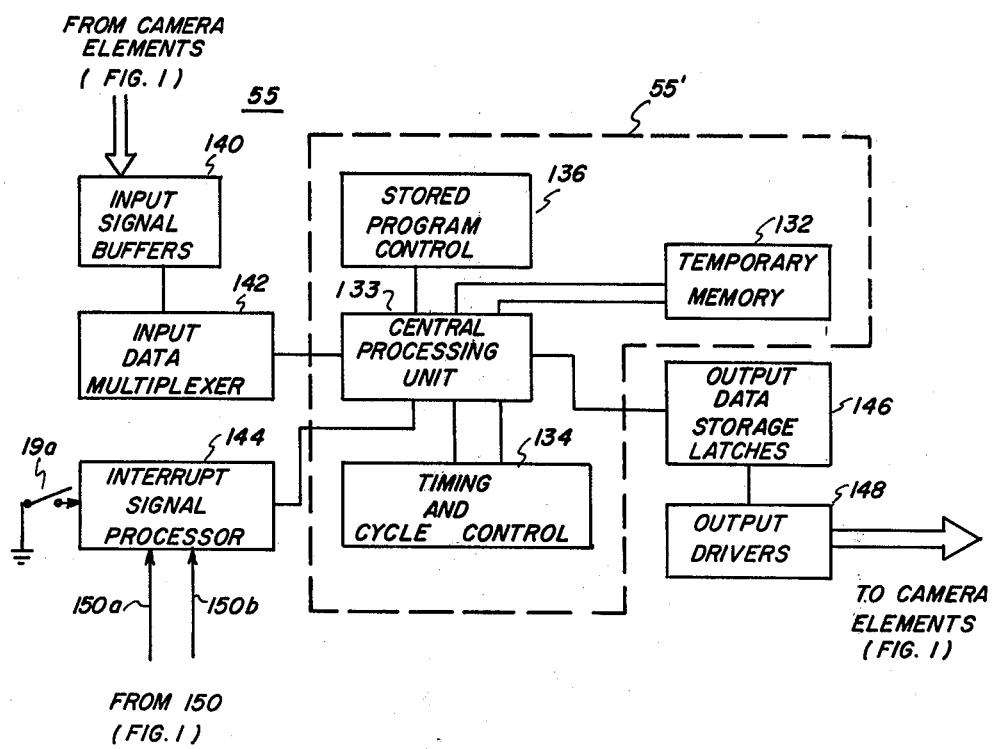
FIG. 4 is a block diagram of the logic and control unit shown in FIG. 1.

In FIG. 4 the LCU 55 includes a microprocessor 55' and a number of gates coupled to such microprocessor. Programming of a number of commercially available microprocessors such as INTEL model 8080 or model 8085 (which along with others can be used in accordance with the invention), is a conventional skill that is well understood. The following disclosure is written to enable a programmer having ordinary skill in the art to produce an appropriate control program for the microprocessor. The particular details of any such program would, of course, depend on the architecture of the designated microprocessor.

The LCU 55' microprocessor consists of temporary data storage memory 132, central processing unit 133, timing and cycle control unit 134, and stored program control 136. The temporary storage memory 132 may be conveniently provided by a conventional, Read/Write memory or Random Access Memory (RAM). The stored program control 136 is provided by a conventional Read Only Memory (ROM). The ROM contains operational programs in the form of binary words corresponding to instructions and values. These programs are permanently stored in the ROM and cannot be altered by the computer operation. Data input and output is performed sequentially under program control. Input data are applied to the central processing unit either through input signal buffer 140 and a multiplexer 142 or through interrupt signal processor 144. As shown, an interrupt signal is provided by rewind button 19a. The input signals are derived from various switches and sensors in the camera. The output data and control signals are applied to storage latches 146 which provide inputs to suitable output drives 148, directly coupled to mechanisms in the camera.

Operation

Let us assume that a cassette 3 is for the first time inserted into the camera 1. A photographer grasps the leader tongue 21 of the filmstrip F and attaches it to the take-up spool 25. The door 11 is closed, and the switch SW5 provides an input to the LCU 55 which now activates the film transport 27. The transport 27 begins to advance the filmstrip F. Thereafter, the initialization bit 115 is detected at reading station 35, and a signal is provided to the LCU 55 through the input signal buffer 140.

The LCU is now conditioned to read the code areas. The reader station 35 provides input signals through the input signal buffer 40. These signals are gated by the LCU through the central processing unit 133 to preassigned storage locations in the temporary memory 132. During this operation, the LCU 55 adjusts exposure control circuitry (not shown) in accordance with the decoded ASA number. After all of the code area bits are decoded, the parity checkbit 117 is decoded. The LCU 55 performs a parity check. If there is a parity error, the LCU 55 causes the filmstrip to rewind and start the process over again. If after several tries the LCU 55 is unable to have an error-free parity check, the LCU will activate the indicator 57 which indicates a defect in the filmstrip code. Assuming there is no parity error, the LCU 55 causes the transport to begin to advance the first film frame to the exposure position. After the first film frame is advanced to the exposure position, the LCU 55 provides a ready signal to the indicator 57.

In order to position the first film frame at the exposure position, a predetermined number of sprocket holes on the top of the filmstrip F must be read by detector device 95. As the sprocket holes are decoded, the device 95 provides signals to the LCU which are inputted through buffers 40 to the central processing unit 133. The central processing unit 133 updates a cumulative count of the total number of sprocket holes which is kept in another preassigned storage location of memory 132. When this predetermined number is reached, the LCU stops film advance. At this position, a bit 121 is at device 97. If bit 121 is not decoded, an error is indicated, and the LCU 55 causes the transport to automatically rewind the filmstrip to a position past the initialization bit. The filmstrip is then advanced until the first film frame is at the exposure position.

Returning to when the code area 69 was decoded, the LCU provided a number (number of film frames on the filmstrip) to still another preassigned location in temporary memory 132. Each time shutter release 19 is actuated and a film frame is exposed, a cumulative number representing the number of exposed film frames is updated in another memory location. A comparison is then made with this number and the number of film frames previously stored in memory. The LCU 55 causes the transport 27 to automatically rewind the filmstrip when the last film frame is exposed. Following film frame exposure, and if there is one or more unexposed film frames, the LCU 55 causes the transport 27 to advance the filmstrip by a predetermined number of sprocket holes to position the next unexposed film frame at the exposure position.

Another function of the LCU is to determine if there is a film break, jam, or disengagement of the leader tongue 21 from the take-up spool 25. This is accomplished during film advance. If the LCU 55 does not receive a sprocket signal within a predetermined time interval, the film transport 27 is disabled and a warning signal is displayed by the indicator 57.

Battery check circuitry 150 is connected acorss the battery 4. When circuitry 150 determines that the battery voltage has fallen below a predetermined level necessary for the memory 132 to retain data, it provdes a signal to the interrupt processor 144 of the LCU 55 by way of lead 150a. In response to this signal, the LCU 55 provides signals to the indidicator 57 which indicates this condition to the photographer. LCU 55 also prevents further exposures of film frames by refusing to accept signals from the shutter release 19. When battery 4 is replaced by a fresh battery providing a voltage above the predetermined level, a signal is provided on lead 150b to the interrupt processor 144. In response to this signal, the LCU 55 causes the motor drive circuit 30 to rewind the filmstrip F past the reading station 35 back into cassettes but not so far as to disconnect the tongue 21 from the take-up spool 25.

During rewind, sprocket detector 95 provides signals to the LCU 55, which stores in a memory location the number of sprocket holes. After the detector 95 no longer decodes a sprocket hole, the LCU 55 stops the movement of the filmstrip. Thereafter, the LCU 55 causes the transport to advance the filmstrip and in accordance with the number of sprocket holes in memory, stops the filmstrip when it has returned to its prior position. During film advance, information corresponding to the code areas is re-entered in memory 132.

Let us assume that a photographer desires to rewind the filmstrip F before all of the image areas are exposed. In such a case, rewind button 19a shown in FIG. 4 is depressed and an input signal is provided to the interrupt signal processor 144 of the LCU 55. The LCU 55 sequences the camera as follows. A reversing signal is provided by the LCU 55 to the film transport 27 which rewinds the filmstrip into the cassette 3. The number of sprocket holes counted up to the point of rewind is transferred into a preassigned memory location of temporary memory 132. The signals of the coded areas also transferred to other preassigned memory locations. These signals identify the particular cassette being removed from the camera and the position of its first unexposed film frame. When the filmstrip is rewound to a position where the sprocket holes are no longer decoded in the reading station 35, the LCU 55 waits a predetermined time period and then deactivates the film transport 27, disconnecting the tongue 21 from the spool 25 but leaving a portion of the tongue 21 outside of the cassette 3. The cassette 3 is now removed from the camera.

Subsequently, other film cassettes are loaded into the camera and pictures are taken. When each subsequent cassette 3 is loaded into the camera, and the filmstrip is moved past the detector, the word in the code area 63 is used to adjust the exposure control. Also, the bits of the coded areas are compared with the signals in temporary memory 132. If they correspond, the LCU 55 produces a comparison signal. In response to this signal, the LCU 55 retrieves the number of sprocket holes in memory and causes the transport 27 to advance the filmstrip the same number of sprocket holes so that the first unexposed film frame is presented to the exposure position. The LCU 55 can store more than one set of cassette identifying signals, thereby identifying two or more different partially used cassettes that have been removed from the camera. The LCU 55 will search these stored signals each time a cassette 3 is loaded into the camera to determine if a previously removed cassette was reloaded into the camera. If so, then the above procedure is used to present the first unexposed film frame to the exposure position.

The invention has been described in detail with particular reference to a preferred embodiment, but it will be understood that other variations and modifications can be affected within the spirit and scope of the invention.

What is claimed is:

1. In a photographic camera for receiving a removable filmstrip with associated indicia that identify such filmstrip, and including means for decoding such indicia and for producing signals corresponding to the indicia, and means for exposing seriatim a plurality of frames on such filmstrip, the improvement comprising:
    (a) means for storing said signals when such a film having at least one unexposed frame is removed from the camera; and
    (b) means effective after loading a filmstrip in the camera for comparing the signals associated with such loaded filmstrip with said stored signals to identify receipt in the camera of a filmstrip having at least one unexposed frame at the time of its last removal from the camera.

2. In a photographic camera for receiving a filmstrip having a predetermined number of unexposed film frames and indicia indentifying such filmstrip, said camera including means for advancing seriatim a filmstrip to present film frames to an exposure position and means for decoding such indicia for producing signals corresponding to the indicia, the improvment comprising:
    (a) means for storing said signals that identify a particular filmstrip that has been removed from the camera and has at least one unexposed film frame;
    (b) means for comparing the identifying signals of subsequently received filmstrips with said stored signal for producing a comparison signal when the particular filmstrip is again received by said camera; and
    (c) means responsive to said comparison signal for conditioning said camera to advance said film strip to a position where an unexposed film frame is presented to said exposure position.

3. In a photographic still camera for receiving film cassettes containing a filmstrip having a predetermined number of unexposed film frames and indicia for idenfitying respective cassettes, said camera including means effective after a cassette is received in the camera for decoding said indicia and for producing cassette identifying signals, means effective when actuated for advancing a filmstrip from its cassette to locate film frames seriatim at an exposure position, and means for exposing such film frames when in said exposure position, the improvement comprising:
    (a) means for producing signals representing the position on the filmstrip of the unexposed film frames in the received cassette;
    (b) means for storing the cassette identifying signals and the signals representing the positions of unexposed film frames when a cassette having an unexposed film frame is removed from said camera;
    (c) means for comparing cassette identifying signals of subsequently received cassettes with said stored identifying signals to produce a comparison signal when a film cassette is reloaded in said camera; and
    (d) means coupled to said comparing means and responsive to said comparison signal and to the signals representing the positions of unexposed film frames for actuating said advancing means to position an unexposed film frame at said exposure position.

* * * * *